United States Patent
Pan et al.

(10) Patent No.: US 12,004,192 B2
(45) Date of Patent: *Jun. 4, 2024

(54) METHODS AND DEVICES FOR CONFIGURING AND MONITORING SEARCH SPACE OF PDCCH

(71) Applicant: VIVO MOBILE COMMUNICATION CO., LTD., Guangdong (CN)

(72) Inventors: Xueming Pan, Chang'an Dongguan (CN); Xiaodong Shen, Chang'an Dongguan (CN); Zichao Ji, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/098,613

(22) Filed: Jan. 18, 2023

(65) Prior Publication Data

US 2023/0156730 A1     May 18, 2023

Related U.S. Application Data

(63) Continuation of application No. 16/638,111, filed as application No. PCT/CN2018/097375 on Jul. 27, 2018, now Pat. No. 11,582,732.

(30) Foreign Application Priority Data

Aug. 11, 2017    (CN) .......................... 201710687931.7

(51) Int. Cl.
*H04W 72/23*      (2023.01)
*H04L 5/00*       (2006.01)

(52) U.S. Cl.
CPC ........... *H04W 72/23* (2023.01); *H04L 5/0053* (2013.01)

(58) Field of Classification Search
CPC ............................. H04L 5/0053; H04W 72/23
(Continued)

(56) References Cited

U.S. PATENT DOCUMENTS 11,582,732 B2 *   2/2023   Pan ......................... H04L 5/005
2011/0292891 A1    12/2011   Hsieh et al.
(Continued)

FOREIGN PATENT DOCUMENTS

CA         2994096 A1     2/2017
CN        102215586 A    10/2011
(Continued)

OTHER PUBLICATIONS

Bala Alhaji Salihu, et al., "New Remapping Strategy for PDCCH Scheduling for LTE-Advanced Systems," Journal of Communications, vol. 9, Issue 7, pp. 563-571 (Jul. 2014).
(Continued)

*Primary Examiner* — Peter G Solinsky
(74) *Attorney, Agent, or Firm* — Brooks Kushman P.C.

(57) ABSTRACT

Methods and devices for configuring and monitoring a search space of a PDCCH are provided. The specific solution includes: transmitting PDCCH configuration information to a UE, where the PDCCH configuration information is for indicating at least one search space of a PDCCH of the UE, and the search space is any one of the following types: a common search space; a group common search space, or a UE specific search space.

20 Claims, 3 Drawing Sheets

(58) Field of Classification Search
USPC .......................................................... 370/329
See application file for complete search history.

(56) References Cited

U.S. PATENT DOCUMENTS

| | | |
|---|---|---|
| 2016/0234833 A1 | 8/2016 | Shimezawa et al. |
| 2016/0249337 A1 | 8/2016 | Liang et al. |
| 2017/0332359 A1 | 11/2017 | Tsai et al. |
| 2018/0270791 A1 | 9/2018 | Park et al. |
| 2018/0279193 A1 | 9/2018 | Park et al. |
| 2018/0279229 A1 | 9/2018 | Dinan et al. |
| 2018/0279358 A1 | 9/2018 | Babaei et al. |
| 2019/0357183 A1 | 11/2019 | Takeda et al. |

FOREIGN PATENT DOCUMENTS

| | | |
|---|---|---|
| CN | 102264135 A | 11/2011 |
| CN | 104519515 A | 4/2015 |
| CN | 105493596 A | 4/2016 |
| CN | 106303977 A | 1/2017 |
| WO | 2017024566 A1 | 2/2017 |
| WO | 2017026971 A1 | 2/2017 |

OTHER PUBLICATIONS

Huawei et al., "Search space design considerations," 3GPP TSG RAN WG1 Meeting #88bis, R1-1704202, pp. 1-4, (Apr. 3-7, 2017).
MediaTek Inc., "Design of Search Space," 3GPP TSG RAN WG1 Meeting #88bis, R1-1704444, pp. 1-6, (Apr. 3-7, 2017).
NTT DOCOMO, Inc., "Search space configuration, " 3GPP TSG RAN WG1 Meeting #88bis, R1-1705737, pp. 1-4, (Apr. 3-7, 2017).
Guangdong OPPO Mobile Telecom., "PDCCH CORESET configuration and UE procedure on NR-PDCCH," 3GPP TSG RAN WG1 Meeting #89, R1-1707703, pp. 1-7, (May 15-19, 2017).
CATT., "Configuration aspects of the NR-PDCCH," 3GPP TSG RAN WG1 Nr Ad-Hoc#2, R1-1710076, pp. 1-3, (Jun. 27-30, 2017).
Samsung., "DL beam management for Nr," 3GPP TSG RAN WG1 NR Ad-Hoc#2, R1-1710654, pp. 1-4, (Jun. 27-30, 2017).
NTT DOCOMO, Inc., "Views on control resource set configuration for NR-PDCCH," 3GPP TSG RAN WG1 NR Ad-Hoc#2, R1-1711090, pp. 1-3, (Jun. 27-30, 2017).
CATT., "[89-20] email discussion: Group-common PDCCH for NR," 3GPP TSG RAN WG1 Meeting # AH_NR2, R1-1710968, pp. 1-22, (Jun. 28, 2017).
CN Search Report dated Oct. 8, 2019 as received in Application No. 201710687931.7.
CN Office Action dated Dec. 24, 2019 as received in Application No. 201710687931.7.
International Search Report and Written Opinion of the International Searching Authority dated Feb. 20, 2020 as received In Application No. PCT/CN2018/097375.
Extended European Search Report dated Jul. 17, 2020 as received in Application No. 18843481.5.
"5G NR-PDCCH Channel Overview and Processing," pp. 1-9 (Jan. 26, 2021) Retrieved from: http://www.techplayon.com/5g-nr-pdcch-channel-overview-and-processing/.
EP Office Action dated May 25, 2021 as received in U.S. Appl. No. 18/843,481 .5.
U.S. First Non-Final Office Action dated Aug. 18, 2021 as received in U.S. Appl. No. 16/638,111.
U.S. First Final Office Action dated Dec. 13, 2021 as received in U.S. Appl. No. 16/638,111.
"Share Technote Website," pp. 1-5 (Oct. 8, 2021) Retrieved from: http://www.sharetechnote.com.
U.S. Second Non-Final Office Action dated Apr. 7, 2022 as received in U.S. Appl. No. 16/638,111.
U.S. Second Final Office Action dated Jul. 26, 2022 as received in U.S. Appl. No. 16/638,111.

* cited by examiner

METHODS AND DEVICES FOR CONFIGURING AND MONITORING SEARCH SPACE OF PDCCH

CROSS-REFERENCE TO RELATED APPLICATION

This application is continuation application of U.S. patent application Ser. No. 16/638,111 filed on Feb. 10, 2020 which is the U.S. national phase of PCT Application No. PCT/CN2018/097375 filed on Jul. 27, 2018, which claims a priority to Chinese Patent Application No. 201710687931.7 filed on Aug. 11, 2017, which are incorporated in their entirety by reference herein.

TECHNICAL FIELD

Embodiments of present disclosure relate to the field of radio communication technology, and in particular to methods and devices for configuring and monitoring a search space of a PDCCH.

BACKGROUND

For 5th generation (5G) mobile communication, in the discussion of the standard of new radio access technology (NR), a user equipment (UE) needs to monitor multiple types of pieces of downlink control information (DCI). The UE can obtain the DCI by detecting, in a search space of the UE through blind detection, a physical downlink control channel (PDCCH) transmitted by a network device.

However, in the related technologies, there is no specific solution for how to set search space for UE, which causes the UE to fail to receive multiple types of pieces of downlink control information in a timely and effective manner.

SUMMARY

Embodiments of the present disclosure provide methods and devices for configuring and monitoring a search space of a PDCCH.

Technical solutions of the embodiments of the present disclosure are as follows.

In a first aspect of the embodiments of the present disclosure, a method for configuring a search space of a PDCCH is provided, which is applied to a network device. The method for configuring the search space of the PDCCH includes: transmitting PDCCH configuration information to a UE, where the PDCCH configuration information is for indicating at least one search space of a PDCCH of the UE, and the search space is any one of the following types: a common search space, a group common search space, or a UE specific search space; where types of DCI transmitted by the network device with the different types of search spaces are different.

In a second aspect of the embodiments of the present disclosure, a method for monitoring a search space of a PDCCH is provided, which is applied to a UE. The method for monitoring the search space of the PDCCH includes: receiving PDCCH configuration information transmitted by a network device; and monitoring a search space of a PDCCH of the UE indicated by the PDCCH configuration information, and receiving DCI corresponding to the search space of the PDCCH of the UE. The PDCCH configuration information is for indicating at least one search space of the PDCCH of the UE, and the search space is any one of the following types: a common search space, a group common search space, or a UE specific search space. Types of downlink control information (DCI) transmitted by the network device with the different types of search spaces are different.

In a third aspect of the embodiments of the present disclosure, a network device is provided. The network device includes a transmitting unit. The transmitting unit is configured to transmit PDCCH configuration information to a UE, where the PDCCH configuration information is for indicating at least one search space of a PDCCH of the UE, and the search space is any one of the following types: a common search space, a group common search space, or a UE specific search space. Types of DCI transmitted by the network device with the different types of search spaces are different.

It should be noted that, for specific implementations of the network device, reference may be made to behavior functions of the network device in the method for configuring the search space of the PDCCH provided in the first aspect above, and details are not described herein. Therefore, the network device provided in the third aspect can achieve the same beneficial effects as the first aspect above.

In a fourth aspect of the embodiments of the present disclosure, a UE is provided. The UE includes a receiving unit. The receiving unit is configured to receive PDCCH configuration information transmitted by a network device, where the PDCCH configuration information is for indicating at least one search space of a PDCCH of the UE, the search space is any one of the following types: a common search space, a group common search space, or a UE specific search space, and types of DCI transmitted by the network device with the different types of search spaces are different. The receiving unit is further configured to monitor the search space of the PDCCH of the UE indicated by the PDCCH configuration information, and receive DCI corresponding to the search space of the PDCCH of the UE.

It should be noted that, for specific implementations of the UE, reference may be made to behavior functions of the UE in the method for monitoring the search space of the PDCCH provided in the second aspect, and details are not described herein. Therefore, the UE provided in the fourth aspect can achieve the same beneficial effects as the second aspect above.

In a fifth aspect of the embodiments of the present disclosure, a network device is provided. The network device may include a processor, a memory, and a program stored on the memory and executable by the processor. When the program is executed by the processor, the method for configuring the search space of the PDCCH according to the first aspect is implemented.

In a sixth aspect of the embodiments of the present disclosure, a computer readable storage medium is provided. The computer readable storage medium has a program stored thereon, and when the program is executed by the processor in the fifth aspect, the method for configuring the search space of the PDCCH is implemented.

In a seventh aspect of the embodiments of the present disclosure, a computer program product is provided. When the computer program product is executed on a computer, the computer is instructed to execute the method for configuring the search space of the PDCCH according to the first aspect.

In an eighth aspect of the embodiments of the present disclosure, a device for configuring a search space of a PDCCH is provided. The device for configuring the search space of the PDCCH exists in a product form of a chip. The device for configuring the search space of the PDCCH may include a processor and a memory, and a program stored on the memory and executable by the processor. When the program is executed by the processor, the method for configuring the search space of the PDCCH according to the first aspect is implemented.

In a ninth aspect of the embodiments of the present disclosure, a UE is provided, and the UE may include a processor, a memory, and a program stored on the memory and executable by the processor. When the program is executed by the processor, the method for monitoring the search space of the PDCCH according to the second aspect is implemented.

In a tenth aspect of the embodiments of the present disclosure, a computer readable storage medium is provided. The computer readable storage medium has a program stored thereon. When the program is executed by the processor in the ninth aspect, the method for monitoring the search space of the PDCCH according to the second aspect is implemented.

In an eleventh aspect of the embodiments of the present disclosure, a computer program product is provided. When the computer program product is executed on a computer, the computer is instructed to execute the method for monitoring the search space of the PDCCH according to the second aspect.

In a twelfth aspect of the embodiments of the present disclosure, a device for monitoring a search space of a PDCCH is provided. The device for monitoring the search space of the PDCCH exists in a product form of a chip. The device for monitoring the search space of the PDCCH may include: a processor, a memory and a program stored on the memory and executable by the processor. When the program is executed by the processor, the method for monitoring the search space of the PDCCH according to the second aspect is implemented.

BRIEF DESCRIPTION OF THE DRAWINGS

To better clarify technical solutions of embodiments of the present disclosure or in the related technologies, drawings used in description of the embodiments of the present disclosure or the related technologies are briefly introduced hereinafter. Apparently, the described drawings merely illustrate a part of the embodiments of the present disclosure. A person ordinary skilled in the art can obtain other drawings based on the described drawings without any creative efforts.

DETAILED DESCRIPTION

In the description of the present disclosure, unless otherwise stated, the term of "multiple" refers to two or more. For example, multiple common search spaces refers to that two or more common search spaces are included.

In the embodiments of the present disclosure, term such as "exemplary" or "for example" are used to indicate example, instance or illustration. Any embodiment or design solution described with "exemplary" or "for example" in the embodiments of the present disclosure should not be construed as more preferred or advantageous over other embodiments or designs. Rather, the use of the term of "exemplary" or "for example" is intended to present relevant concepts in a concrete manner.

In addition, terms such as "include" and "have" and any variations thereof in the description of the present disclosure are intended to cover non-exclusive inclusion. For example, a process, method, system, product, or device including a series of steps or units is not limited to those steps or units that are explicitly listed, but may optionally include other steps or units that are not explicitly listed or that are inherent in the process, method, product, or device.

In the following description, for the purpose of explanation rather than limitation, specific details such as specific system structure, interface, and technology are provided to thoroughly understand the present disclosure. However, it should be clear to those skilled in the art that the present disclosure can be implemented in other embodiments without these specific details. In other cases, detailed descriptions of well-known devices, circuits, and methods are omitted, so as not to obscure the description of the present disclosure with unnecessary details.

Methods and devices for configuring and monitoring a search space of a PDCCH provided by the embodiments of the present disclosure may be applied to the process of configuring the search space of the PDCCH and monitoring the search space of the PDCCH.

Some concepts involved in the methods and devices for configuring and monitoring the search space of the PDCCH provided by the embodiments of the present disclosure are explained hereinafter.

Search space: a search space in a Long Term Evolution (LTE) system is defined as a series of control channel element (CCE) resources that need to be blindly detected for each aggregation level, including CCE starting position and the quantity of candidate resources.

Common search space: a common search space is commonly used by all UEs in a cell.

Group common search space: a group common search space is used by a group, including M UEs, in a cell.

UE specific search space: a UE specific search space is used by a UE.

Control Resource Set (CORESET): a type of time-frequency resource set introduced in NR. The UE detects PDCCH on the corresponding control resource set. The control resource set is formed by a set of resource element groups (REGs).

Quasi-Co-Location (QCL) relationship: a QCL relationship between two signals means that the two signals have some correlation in statistical characteristics, including delay spread, Doppler spread, Doppler shift, average gain and average delay.

Wideband reference signal: a reference signal transmitted on a control resource set bandwidth corresponding to a search space.

Narrowband reference signal: a reference signal in a CCE bandwidth occupied by a PDCCH in a search space.

The embodiments of the present disclosure are described in detail with reference to the drawings hereinafter.

Figure 1:
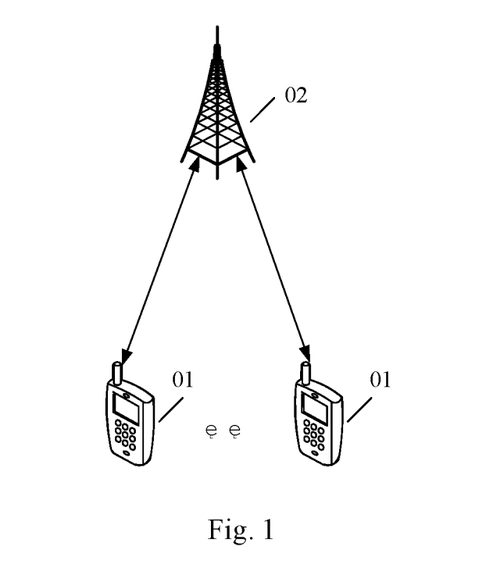
FIG. 1 is a schematic diagram of a system architecture according to embodiments of the present disclosure.

Reference is made to FIG. 1. FIG. 1 is a schematic diagram of a system architecture to which methods and devices for configuring and monitoring a search space of a PDCCH according to embodiments of the disclosure are applied. As shown in FIG. 1, the system architecture may include a UE 01 and a network device (such as a base station 02). The UE 01 and the base station 02 are communicatively connected.

UE 01 may refer to a device configured to provide voice and/or data connectivity to a user, a handheld device with wired connection/wireless connection function, or any other processing device connected to a wireless modem. UE 01 may communicate with one or more network devices via a radio access network (RAN). UE 01 may be a mobile terminal, such as a mobile phone (or a cellular phone) or a computer equipped with a mobile terminal, or may be a portable, pocket-sized, handheld, computer-built-in or vehicle-mounted mobile device, which exchanges voice and/or data with a RAN. For example, it may be a personal communication service (PCS) phone, a cordless phone, a session initiation protocol (SIP) phone, a wireless local loop (WLL) station, or a personal digital assistant (PDA), which is not limited herein.

The base station is a device deployed in a radio access network, to provide a radio communication function for the UE 01. The base station may include various forms such as macro base station, micro base station, relay station, access point, and so on. In systems using different radio access technologies, the names of devices with base station functions may be different. For example, in an LTE system, it may be called an evolved base station (evolved NodeB, eNB, or eNodeB); in a 3rd generation telecommunication (3G) system, it may be called a base station (Node B), and so on. As communication technology evolves, the name of "base station" may change.

Figure 2:
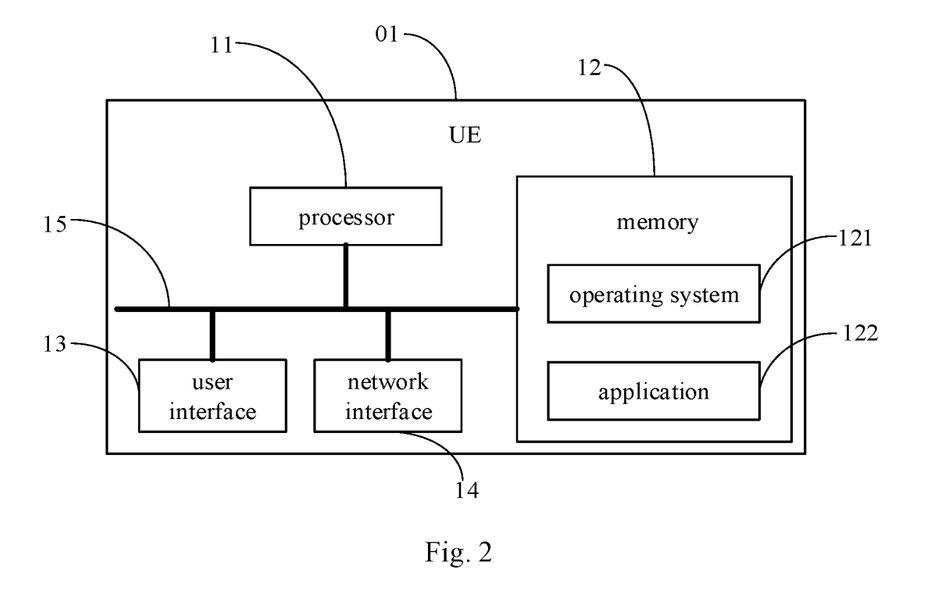
FIG. 2 is a schematic structural diagram of a UE according to embodiments of the present disclosure.

Embodiments of the present disclosure provide a UE. FIG. 2 is a schematic structural diagram of a UE 01 provided by embodiments of the present disclosure. As shown in FIG. 2, the UE 01 includes: at least one processor 11, a memory 12, a user interface 13, and at least one network interface 14. The various components in the UE 01 are coupled together via a bus system 15.

It can be understood that the bus system 15 is configured to implement connection and communication between these components. In addition to a data bus, the bus system 15 includes a power bus, a control bus, and a state signal bus. For clarity, various buses are marked as the bus system 15 in FIG. 2.

The user interface 13 may include a display, a keyboard, or a clicking device (such as, a mouse, a trackball), a touch panel, or a touch screen.

It can be understood that the memory 12 in the embodiments of the present disclosure may be a volatile memory or a non-volatile memory, or may include both volatile and non-volatile memories. The non-volatile memory may be a read-only memory (ROM), a programmable read-only memory (Programmable ROM, PROM), an erasable programmable read-only memory (Erasable PROM, EPROM), or an electrically erasable programmable read-only memory (Electrically EPROM, EEPROM) or a flash memory. The volatile memory may be a random access memory (RAM) that acts as a high-speed external cache. By way of example and not limitation, various kinds of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SDRAM) or a direct rambus random access memory (Direct Rambus RAM, DRRAM). The memory 12 described in the embodiments of the present disclosure is intended to include, without being limited to, these and any other suitable types of memories.

In some implementations, the memory 12 stores the following elements, executable modules or data structures, or a subset thereof, or an extended set thereof: operating system 121 and application 122.

The operating system 121 includes various system programs such as a framework layer, a core library layer and a driving layer, for implementing various fundamental services and processing hardware-based tasks. The application 122 includes various applications such as media player and browser, for implementing various application services. A program for implementing the method according to the embodiments of the present disclosure may be included in the application 122.

In the embodiments of the present disclosure, the UE 01 may further include a computer program stored on the memory 12 and executable by the processor 11, and when the computer program is executed by the processor 11, the steps of the method provided by the embodiments of the present disclosure are implemented.

The methods according to the foregoing embodiments of the present disclosure may be applied to the processor 11, or implemented by the processor 11. The processor 11 may be an integrated circuit chip with signal processing capabilities. In implementation, each step of the foregoing methods may be completed by an integrated logic circuit in form of hardware in the processor 11 or instructions in form of software. The processor 11 above may be a general-purpose processor, a digital signal processor (DSP), an application specific integrated circuit (ASIC), a field programmable gate array (FPGA) or any other programmable logic device, a discrete gate, a transistor logic device or a discrete hardware component, which can implement or carry out the methods, steps, and logical block diagrams according to the embodiments of the present disclosure. The general-purpose processor may be a microprocessor, or the processor may be any conventional processor or the like. The steps of the methods according to the embodiments of the present disclosure may be directly implemented by a hardware decoding processor, or may be performed by a combination of hardware and software modules in the decoding processor. The software module may be located in a conventional well-developed computer readable storage medium such as a random access memory, a flash memory, a read-only memory, a programmable read-only memory, an electrically erasable programmable memory, a register, or the like. The computer readable storage medium is located in the memory 12, and the processor 11 reads the information in the memory 12 and completes the steps of the above methods in combination with its hardware. Specifically, a computer program is stored on the computer readable storage medium, and when the computer program is executed by the processor 11, the steps of the method embodiments provided by the embodiments of the present disclosure are implemented.

It can be understood that the embodiments described herein may be implemented in hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, other electronics units for performing the functions according to the present disclosure or a combination thereof.

For software implementation, the technical solutions according to the embodiments of the present disclosure may be implemented by modules (e.g., processes, functions, and so on) for performing the functions according to the embodiments of the present disclosure. Software codes may be stored in a memory and executed by a processor. The memory may be implemented in the processor or external to the processor.

Figure 3:
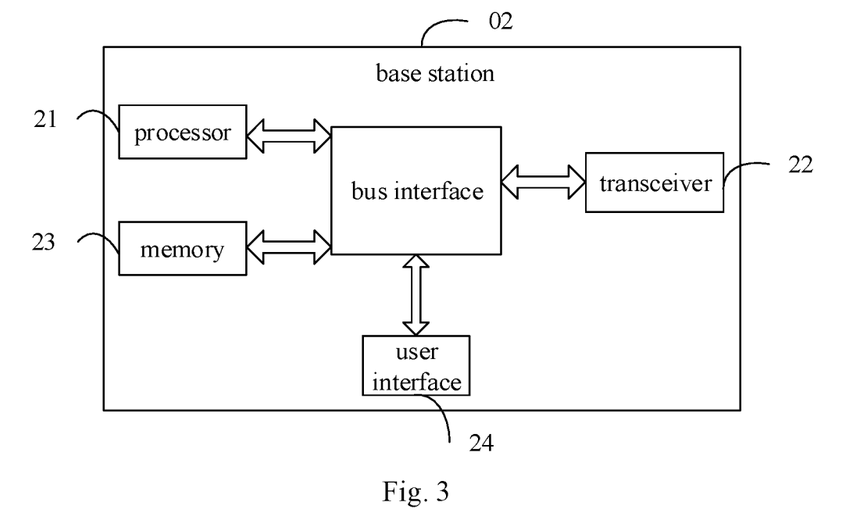
FIG. 3 is a schematic structural diagram of a base station according to embodiments of the present disclosure.

Embodiments of the present disclosure provide a base station. FIG. 3 is a schematic structural diagram of a base station 02 provided by embodiments of the present disclosure. As shown in FIG. 3, the base station 02 includes: a processor 21, a transceiver 22, a memory 23, a user interface 24, and a bus interface.

The processor 21 may be in charge of managing the bus architecture and common processes. The memory 23 may be configured to store data used by the processor 21 in performing operations.

In the embodiments of the present disclosure, the base station 02 may further include: a computer program stored on the memory 23 and executable by the processor 21, and when the computer program is executed by the processor 21, the steps of the method provided by the embodiments of the present disclosure are implemented.

In FIG. 3, a bus architecture may include any quantity of interconnected buses and bridges. Various circuits including one or at least two processors represented by the processor 21 and a memory represented by the memory 23 are coupled together. The bus architecture may also couple various other circuits such as a peripheral component, a voltage regulator, and a power management circuit, which are well known in the art and thus are not further described herein. A bus interface provides an interface. The transceiver 22 may be multiple elements, i.e., including a transmitter and a receiver, which provides a unit for communicating with various other devices on a transmission medium. For different UEs, the user interface 24 may be an interface capable of connecting needed external or internal devices. The connected devices include, but not limited to, a keypad, a display, a speaker, a microphone, a joystick, and the like.

Figure 4:
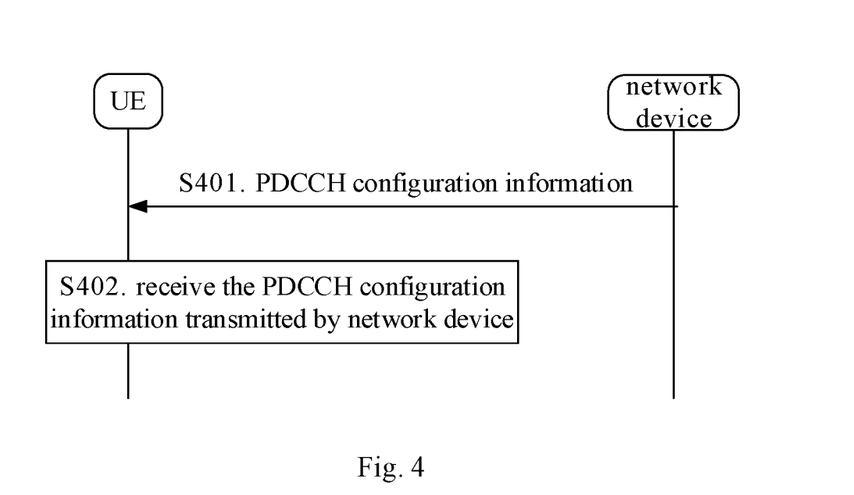
FIG. 4 is a flowchart of a method for configuring a search space of a PDCCH according to embodiments of the present disclosure.

Based on the interaction between the UE 01 and the base station 02 in the system shown in FIG. 1, each module or component of the UE 01 shown in FIG. 2, and each module or component of the base station 02 shown in FIG. 3, a method for configuring a search space of a PDCCH is provided according to the embodiments of the present disclosure. In the method, the interaction process between the UE and the network device is described in detail. Specifically, as shown in FIG. 4, the method for configuring the search space of the PDCCH may include steps S401 to S402.

In step S401, the network device transmits PDCCH configuration information to the UE.

The PDCCH configuration information is for indicating at least one search space of a PDCCH of the UE, and the search space is any one of the following types: a common search space, a group common search space, or a UE specific search space. Types of downlink control information (DCI) transmitted by the network device with the different types of search spaces are different.

Exemplarily, the network device may transmit high layer signaling to the UE via the transceiver 22, where the high layer signaling carries the PDCCH configuration information. Or, the network device may transmit the PDCCH configuration information to the UE via the transceiver 22, in a form of broadcasting a system message (such as a master information block) to the UE. The PDCCH configuration information may be predefined by the network device according to one or more of: a system bandwidth, a subcarrier spacing, antenna configuration, or a carrier frequency, etc.

One common search space is commonly used by N UEs, one or more common search spaces correspond to one control resource set, and N is a positive integer greater than or equal to 2.

Exemplarily, a common search space may be commonly used by all UEs in a cell. The control resource set is a type of time-frequency resource set introduced in the NR. The UE detects PDCCH in the corresponding control resource set. The control resource set is formed by a set of resource element groups (REG).

One group common search space is used by a group including M UEs, one or more group common search spaces correspond to one control resource set, and M is a positive integer greater than or equal to 2.

For example, it is assumed that there are 10 UEs in a cell, Group 1 including 3 UEs uses a group common search space, Group 2 including 4 UEs uses a group common search space, and Group 3 including 3 UEs uses a group common search space.

One UE specific search space is used by one UE, and one or more UE specific search spaces correspond to one control resource set.

Exemplarily, in a first application scenario of the embodiments of the present disclosure, the search space is the common search space. Correspondingly, the DCI transmitted by the network device using the common search space includes at least one of the following information: DCI for scheduling system information, DCI for scheduling paging information, or DCI for scheduling a random access response message.

In the first application scenario of the embodiments of the present disclosure, the PDCCH transmitted with the common search space has a QCL relationship with a synchronization signal or a group of synchronization signals. There is a correspondence between the synchronization signal or the group of synchronization signals and a physical broadcast channel (PBCH) configuring a physical resource of the common search space.

There being a correspondence between the synchronization signal or the group of synchronization signals and the PBCH configuring the physical resource of the common search space includes that: time index(es) of the synchronization signal or the group of synchronization signals and a time index of the PBCH configuring the physical resource of the common search space are the same. That is, the synchronization signal or the group of synchronization signals are in the same beam as the PBCH configuring the physical resource of the common search space.

Exemplarily, in a second application scenario of the embodiments of the present disclosure, the search space is the group common search space. Correspondingly, the DCI transmitted by the network device using the group common search space includes at least one of the following information: DCI for transmitting a group based power control command, DCI for transmitting group based slot format information, or DCI for transmitting group based resource preemption indication.

In the second application scenario of the embodiments of the present disclosure, the PDCCH transmitted with the group common search space has a QCL relationship with a synchronization signal or a group of synchronization signals, and the synchronization signal or the group of synchronization signals are configured by the network device; or, the PDCCH transmitted with the group common search space has a QCL relationship with a channel state information-reference signal (CSI-RS) or a group of CSI-RSs, and the CSI-RS or the group of CSI-RSs are configured by the network device.

Exemplarily, in a second application scenario of the embodiments of the present disclosure, a position of the search space of the UE may be explicitly configured by the network device. Correspondingly, the PDCCH configuration information may specifically include search space position information of the UE. The search space position information of the UE is for indicating a position of the search space of the UE, and the position of the search space of the UE is irrelevant to an identity of the UE.

The search space position information of the UE may include at least one of: a starting position of the search space of the UE, a control channel element (CCE) aggregation level of the search space of the UE, or the quantity of PDCCH candidate resources of the search space of the UE. For example, the CCE aggregation level of the search space of the UE may include {1,2,4,8,16,32}.

Exemplarily, in the second application scenario of the embodiments of the present disclosure, the position of the search space of the UE also be implicitly configured by the network device. Correspondingly, search space position information of the UE is pre-configured by a protocol, and the position of the search space of the UE is irrelevant to an identity of the UE. It should be noted that, for specific content of the search space position information of the UE, reference can be made to the description in the foregoing embodiments, and details are not described herein.

For example, the search space position information of the UE pre-configured by the protocol may be starting from CCE #0 in a fixed manner, and/or fixed aggregation level.

In the second application scenario of the embodiments of the present disclosure, positions of search spaces of UEs meeting at least one of the following conditions are the same: starting positions of the search spaces of the UEs are the same, CCE aggregation levels of the search spaces of the UEs are the same, or, the quantities of PDCCH candidate resources of the search spaces of the UEs are the same; and the embodiments of the present disclosure are not limited thereto.

Exemplarily, in a third application scenario of the embodiments of the present disclosure, the search space is the UE specific search space. Correspondingly, the DCI transmitted by the network device using the UE specific search space includes at least one of the following information: DCI for UE-specific scheduling, or DCI for semi-persistent scheduling. Time-frequency resources of control resource sets corresponding to UE specific search spaces of PDCCHs of different UEs are orthogonal, overlapped or partially overlapped.

In the third application scenario of the embodiments of the present disclosure, the PDCCH transmitted with the UE specific search space has a QCL relationship with a synchronization signal or a group of synchronization signals, and the synchronization signal or the group of synchronization signals are configured by the network device; or, the PDCCH transmitted with the UE specific search space has a QCL relationship with a CSI-RS or a group of CSI-RSs, and the CSI-RS or the group of CSI-RSs are configured by the network device.

Exemplarily, in the third application scenario of the embodiments of the present disclosure, the position of the search space of the UE may be explicitly configured by the network device. Accordingly, the PDCCH configuration information may specifically include search space position information of the UE, and the position of the search space of the UE is relevant to an identity of the UE. It should be noted that, for specific content of the search space position information of the UE, reference can be made to the description in the foregoing embodiments, and details are not described herein.

Exemplarily, in the third application scenario of the embodiments of the present disclosure, the position of the search space of the UE may be implicitly configured by the network device. Correspondingly, search space position information of the UE is pre-configured by a protocol, and the position of the search space of the UE is relevant to an identity of the UE. It should be noted that, for specific content of the search space position information of the UE, reference can be made to the description in the foregoing embodiments, and details are not described herein.

In step S402, the UE receives the PDCCH configuration information transmitted by the network device.

The UE may receive, via the network interface 14, the PDCCH configuration information transmitted by the network device. The UE may determine the search space of the PDCCH of the UE according to an indication of the PDCCH configuration information.

The method for configuring the search space of the PDCCH is provided according to the embodiments of the present disclosure. The network device achieves the object of configuring the search space of the PDCCH of the UE by transmitting the PDCCH configuration information to the UE. In addition, since the network device transmits the PDCCH configuration information to the UE to indicate at least one search space of the PDCCH of the UE, the UE may be enabled to detect PDCCH in the search space of the PDCCH of the UE indicated by the PDCCH configuration information, thereby ensuring that the UE can receive DCI from the network device in a timely and effective manner.

Figure 5:
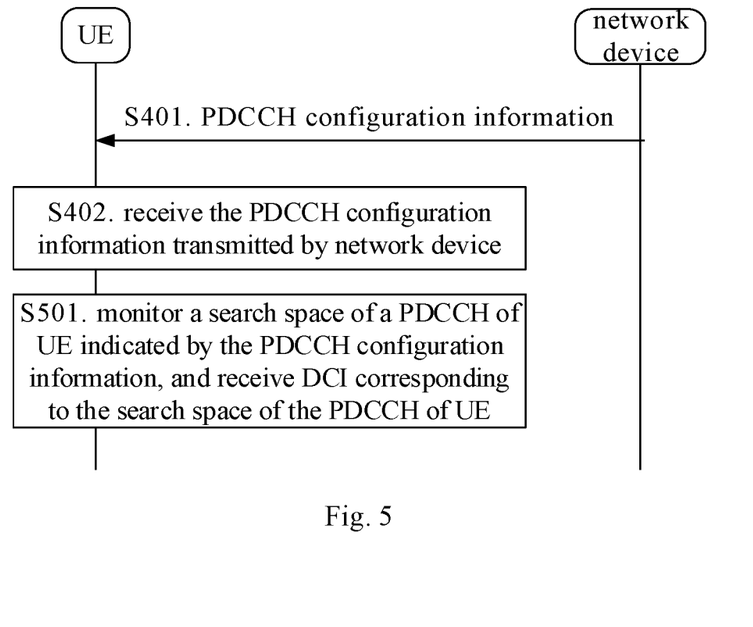
FIG. 5 is a flowchart of a method for monitoring a search space of a PDCCH according to embodiments of the present disclosure.

Further, after the UE is configured with the search space of the PDCCH of the UE, PDCCH detection may be performed in the search space of the PDCCH of the UE. Specifically, the embodiments of the present disclosure further provide a method for monitoring a search space of a PDCCH. Reference is made to FIG. 5, as compared with the method for configuring the search space of the PDCCH shown in FIG. 4, step S501 is further performed after step S402 described above. Only different parts are described in detail herein. Referring to FIG. 5, the method for monitoring the search space of the PDCCH includes steps S401, S402, and S501.

In step S401, the network device transmits PDCCH configuration information to the UE.

In step S402, the UE receives the PDCCH configuration information transmitted by the network device.

In step S501, the UE monitors the search space of the PDCCH of the UE indicated by the PDCCH configuration information, and receives DCI corresponding to the search space of the PDCCH of the UE.

The UE may receive the DCI transmitted by the network device, in the search space of the PDCCH of the UE configured by the network device, and the type of the DCI corresponds to the search space of the PDCCH of the UE.

For example, the network device uses a common search space 1 to transmit DCI, and the UE monitors the PDCCH in the common search space 1 of the PDCCH of the UE, to receive the DCI (such as DCI for scheduling system information, DCI for scheduling paging information and/or DCI for scheduling a random access response message) corresponding to the common search space 1 of the PDCCH of the UE; the network device uses a group common search space 2 to transmit DCI, and the UE monitors the PDCCH in the group common search space 2 of the PDCCH of the UE, to receive the DCI (DCI for transmitting a group based power control command, DCI for transmitting group based slot format information and/or DCI for transmitting group based resource preemption indication) corresponding to the group common search space 2 of the PDCCH of the UE.

Exemplarily, in the embodiments of the present disclosure, a reference signal used by the UE to monitor the PDCCH in the common search space includes a wideband reference signal or a narrowband reference signal, the wideband reference signal is a reference signal transmitted in a control resource set bandwidth corresponding to the common search space, and the narrowband reference signal is a reference signal in a CCE bandwidth occupied by the PDCCH in the common search space.

Exemplarily, in the embodiments of the present disclosure, a reference signal used by the UE to monitor the PDCCH in the group common search space includes a wideband reference signal or a narrowband reference signal, the wideband reference signal is a reference signal transmitted in a control resource set bandwidth corresponding to the group common search space, and the narrowband reference signal is a reference signal in a CCE bandwidth occupied by the PDCCH in the group common search space.

Exemplarily, in the embodiments of the present disclosure, a reference signal used by the UE to monitor the PDCCH in the UE specific search space includes a narrowband reference signal, and the narrowband reference signal is a reference signal in a CCE bandwidth occupied by the PDCCH in the UE specific search space.

The method for monitoring the search space of the PDCCH is provided according to the embodiments of the present disclosure. The UE may monitor the PDCCH in the search space of the PDCCH of the UE indicated by the PDCCH configuration information. Since the PDCCH configuration information is for indicating at least one search space of the PDCCH of the UE, when the UE performs PDCCH detection in the search space of the PDCCH of the UE indicated by the PDCCH configuration information, it can be ensured that the UE may receive, in a timely and effective manner, the DCI transmitted by the network device.

The above mainly introduces the solutions provided by the embodiments of the present disclosure from the perspective of the network device and the UE. It can be understood that, in order to implement the above functions, the network device and the UE include a hardware structure and/or a software module corresponding to the various functions. Those skilled in the art will appreciate that the network device, the UE and the algorithm steps described in conjunction with the embodiments according to the present disclosure may be implemented in the form of hardware or a combination of hardware and computer software. Whether a function is performed in hardware or in hardware driven by computer software depends on the specific application and design constraints of the solution. Those skilled in the art may use different methods to implement the described functions for each particular application, and such implementations are not to be considered as departing from the scope of the present disclosure.

The embodiments of the present disclosure may divide the network device and the UE into functional modules or functional units according to the foregoing method examples. For example, each functional module or functional unit may be divided corresponding to each function, or two or more functions may be integrated in a processing module. The integrated module may be implemented in the form of hardware, or in the form of software functional module or functional unit. The division of modules or units in the embodiments of the present disclosure is exemplary, and the modules or units are divided merely in logical function, which may be divided in another way in actual implementation.

Figure 6:
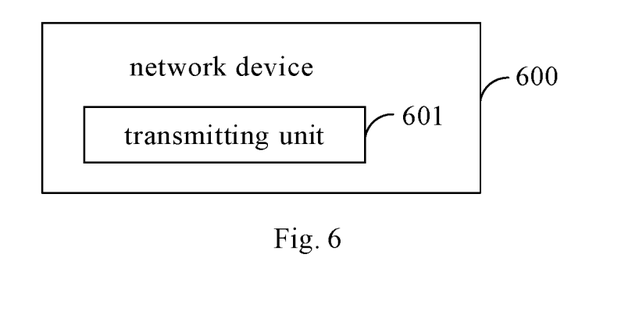
FIG. 6 is a schematic structural diagram of a network device according to embodiments of the present disclosure.

In a case where each functional module is divided according to each function, FIG. 6 shows a practicable structural diagram of the network device involved in the foregoing embodiments. As shown in FIG. 6, the network device 600 may include: a transmitting unit 601.

The transmitting unit 601 is configured to transmit physical downlink control channel (PDCCH) configuration information to a user equipment (UE), where the PDCCH configuration information is for indicating at least one search space of a PDCCH of the UE, and the search space is any one of the following types: a common search space, a group common search space, or a UE specific search space. Types of downlink control information (DCI) transmitted by the network device with the different types of search spaces are different.

The transmitting unit 601 is configured to support step S401 in the foregoing embodiments, and/or other processes used in the technology described herein.

In a practicable implementation, one common search space is commonly used by N UEs, one or more common search spaces correspond to one control resource set, and N is a positive integer greater than or equal to 2. One group common search space is used by a group including M UEs, one or more group common search spaces correspond to one control resource set, and M is a positive integer greater than or equal to 2. One UE specific search space is used by one UE, and one or more UE specific search spaces correspond to one control resource set.

In a practicable implementation, in a case that the search space is the common search space, the DCI includes at least one of: DCI for scheduling system information, DCI for scheduling paging information, or DCI for scheduling a random access response message.

In a practicable implementation, in a case that the search space is the group common search space, the DCI includes at least one of: DCI for transmitting a group based power control command, DCI for transmitting group based slot format information, or DCI for transmitting group based resource preemption indication.

In a practicable implementation, in a case that the search space is the UE specific search space, the DCI includes at least one of: DCI for UE-specific scheduling, or DCI for semi-persistent scheduling.

In a practicable implementation, time-frequency resources of control resource sets corresponding to UE specific search spaces of PDCCHs of different UEs are orthogonal, overlapped or partially overlapped.

In a practicable implementation, the PDCCH transmitted with the common search space has a QCL relationship with a synchronization signal or a group of synchronization signals. There is a correspondence between the synchronization signal or the group of synchronization signals and a physical broadcast channel (PBCH) configuring a physical resource of the common search space.

In a practicable implementation, there being a correspondence between the synchronization signal or the group of synchronization signals and the PBCH configuring the physical resource of the common search space includes that: time index(es) of the synchronization signal or the group of synchronization signals and a time index of the PBCH configuring the physical resource of the common search space are the same.

In a practicable implementation, the PDCCH transmitted with the group common search space has a QCL relationship with a synchronization signal or a group of synchronization signals, and the synchronization signal or the group of synchronization signals are configured by the network device. Or, the PDCCH transmitted with the group common search space has a QCL relationship with a channel state information-reference signal (CSI-RS) or a group of CSI-RSs, and the CSI-RS or the group of CSI-RSs are configured by the network device.

In a practicable implementation, the PDCCH configuration information includes search space position information of the UE, and a position of the search space of the UE is irrelevant to an identity of the UE. The search space position information of the UE includes at least one of: a starting position of the search space of the UE, a control channel element (CCE) aggregation level of the search space of the UE, or the quantity of PDCCH candidate resources of the search space of the UE.

In a practicable implementation, search space position information of the UE is pre-configured by a protocol, and a position of the search space of the UE is irrelevant to an identity of the UE. The search space position information of the UE includes at least one of: a starting position of the search space of the UE, a CCE aggregation level of the search space of the UE, or the quantity of PDCCH candidate resources of the search space of the UE.

In a practicable implementation, positions of search spaces of UEs meeting at least one of the following conditions are the same: starting positions of the search spaces of the UEs are the same, CCE aggregation levels of the search spaces of the UEs are the same, or, the quantities of PDCCH candidate resources of the search spaces of the UEs are the same.

In a practicable implementation, the PDCCH transmitted with the UE specific search space has a QCL relationship with a synchronization signal or a group of synchronization signals, and the synchronization signal or the group of synchronization signals are configured by the network device. Or, the PDCCH transmitted with the UE specific search space has a QCL relationship with a CSI-RS or a group of CSI-RSs, and the CSI-RS or the group of CSI-RSs are configured by the network device.

In a practicable implementation, the PDCCH configuration information includes search space position information of the UE, and a position of the search space of the UE is relevant to an identity of the UE. The search space position information of the UE includes at least one of: a starting position of the search space of the UE, a CCE aggregation level of the search space of the UE, or the quantity of PDCCH candidate resources of the search space of the UE.

In a practicable implementation, search space position information of the UE is pre-configured by a protocol, and a position of the search space of the UE is relevant to an identity of the UE. The search space position information of the UE includes at least one of: a starting position of the search space of the UE, a CCE aggregation level of the search space of the UE, or the quantity of PDCCH candidate resources of the search space of the UE.

The network device 600 provided by the embodiments of the present disclosure includes but is not limited to the above-mentioned units. For example, the network device 600 may further include a receiving unit and a storage unit.

Embodiments of the present disclosure further provide a computer readable storage medium. The computer readable storage medium stores a computer program. When the processor of the network device 600 executes the computer program, the network device 600 executes the steps of the related method shown in any of FIG. 4 and FIG. 5.

Embodiments of the present disclosure also provide a computer program product, which causes the computer to execute the steps of the related method in any of FIG. 4 and FIG. 5 when the computer program product runs on the computer.

The network device 600, the computer readable storage medium, or the computer program product provided by the embodiments of the present disclosure is for executing the corresponding methods provided above. Therefore, for the beneficial effects that can be achieved, reference can be made to the beneficial effects in the corresponding methods described above, which are not repeated herein.

Figure 7:
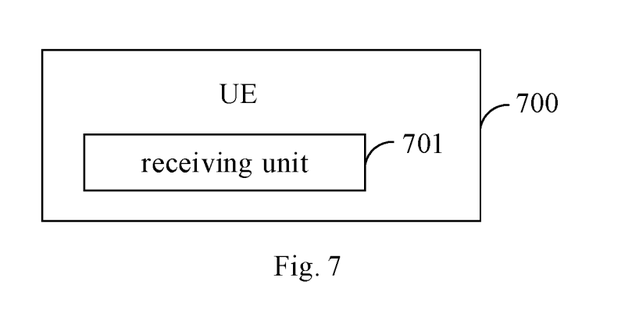
FIG. 7 is a schematic structural diagram of a UE according to embodiments of the present disclosure.

In a case where each functional module is divided according to each function, FIG. 7 illustrates a practicable structural diagram of the UE involved in the foregoing embodiments. As shown in FIG. 7, the UE 700 may include a receiving unit 701.

The receiving unit 701 is configured to receive PDCCH configuration information transmitted by a network device; monitor a search space of a PDCCH of the UE indicated by the PDCCH configuration information, and receive DCI corresponding to the search space of the PDCCH of the UE. The PDCCH configuration information is for indicating at least one search space of the PDCCH of the UE, and the search space is any one of the following types: a common search space, a group common search space, or a UE specific search space. Types of downlink control information (DCI) transmitted by the network device with the different types of search spaces are different.

The receiving unit 701 is configured to support steps S402 and S501 in the foregoing embodiments, and/or other processes in the technology described herein.

In a practicable implementation, one common search space is commonly used by N UEs, one or more common search spaces correspond to one control resource set, and N is a positive integer greater than or equal to 2. One group common search space is used by a group including M UEs, and one or more group common search spaces correspond to one control resource set, and M is a positive integer greater than or equal to 2. One UE specific search space is used by one UE, and one or more UE specific search spaces correspond to one control resource set.

In a practicable implementation, in a case that the search space is the common search space, the DCI includes at least one of: DCI for scheduling system information, DCI for scheduling paging information, or DCI for scheduling a random access response message.

In a practicable implementation, in a case that the search space is the group common search space, the DCI includes at least one of: DCI for transmitting a group based power control command, DCI for transmitting group based slot format information, or DCI for transmitting group based resource preemption indication.

In a practicable implementation, in a case that the search space is the UE specific search space, the DCI includes at least one of: DCI for UE-specific scheduling, or DCI for semi-persistent scheduling.

In a practicable implementation, time-frequency resources of control resource sets corresponding to UE specific search spaces of PDCCHs of different UEs are orthogonal, overlapped or partially overlapped.

In a practicable implementation, the PDCCH transmitted with the common search space has a quasi-co-location (QCL) relationship with a synchronization signal or a group of synchronization signals. There is a correspondence between the synchronization signal or the group of synchronization signals and a physical broadcast channel (PBCH) configuring a physical resource of the common search space.

In a practicable implementation, there being a correspondence between the synchronization signal or the group of synchronization signals and the PBCH configuring the physical resource of the common search space includes that: time index(es) of the synchronization signal or the group of synchronization signals and a time index of the PBCH configuring the physical resource of the common search space are the same.

In a practicable implementation, the PDCCH transmitted with the group common search space has a QCL relationship with a synchronization signal or a group of synchronization signals, and the synchronization signal or the group of synchronization signals are configured by the network device. Or, the PDCCH transmitted with the group common search space has a QCL relationship with a channel state information-reference signal (CSI-RS) or a group of CSI-RSs, and the CSI-RS or the group of CSI-RSs are configured by the network device.

In a practicable implementation, the PDCCH configuration information includes search space position information of the UE, and a position of the search space of the UE is irrelevant to an identity of the UE. The search space position information of the UE includes at least one of: a starting position of the search space of the UE, a control channel element (CCE) aggregation level of the search space of the UE, or the quantity of PDCCH candidate resources of the search space of the UE.

In a practicable implementation, search space position information of the UE is pre-configured by the protocol, and a position of the search space of the UE is irrelevant to an identity of the UE. The search space position information of the UE includes at least one of: a starting position of the search space of the UE, a CCE aggregation level of the search space of the UE, or the quantity of PDCCH candidate resources of the search space of the UE.

In a practicable implementation, positions of search spaces of UEs meeting at least one of the following conditions are the same: starting positions of the search spaces of the UEs are the same, CCE aggregation levels of the search spaces of the UEs are the same, or, the quantities of PDCCH candidate resources of the search spaces of the UEs are the same.

In a practicable implementation, the PDCCH transmitted with the UE specific search space has a QCL relationship with a synchronization signal or a group of synchronization signals, and the synchronization signal or the group of synchronization signals are configured by the network device. Or, the PDCCH transmitted with the UE specific search space has a QCL relationship with a CSI-RS or a group of CSI-RSs, and the CSI-RS or the group of CSI-RSs are configured by the network device.

In a practicable implementation, the PDCCH configuration information includes search space position information of the UE, and a position of the search space of the UE is relevant to an identity of the UE. The search space position information of the UE includes at least one of: a starting position of the search space of the UE, a CCE aggregation level of the search space of the UE, or the quantity of PDCCH candidate resources of the search space of the UE.

In a practicable implementation, search space position information of the UE is pre-configured by a protocol, and a position of the search space position of the UE is relevant to an identity of the UE. The search space position information of the UE includes at least one of: a starting position of the search space of the UE, a CCE aggregation level of the search space of the UE, or the quantity of PDCCH candidate resources of the search space of the UE.

In a practicable implementation, a reference signal used by the UE to monitor the PDCCH in the common search space includes a wideband reference signal or a narrowband reference signal, the wideband reference signal is a reference signal transmitted in a control resource set bandwidth corresponding to the common search space, and the narrowband reference signal is a reference signal in a CCE bandwidth occupied by the PDCCH in the common search space.

In a practicable implementation, a reference signal used by the UE to monitor the PDCCH in the group common search space includes a wideband reference signal or a narrowband reference signal, the wideband reference signal is a reference signal transmitted in a control resource set bandwidth corresponding to the group common search space, and the narrowband reference signal is a reference signal in a CCE bandwidth occupied by the PDCCH in the group common search space.

In a practicable implementation, a reference signal used by the UE to monitor the PDCCH in the UE specific search space includes a narrowband reference signal, and the narrowband reference signal is a reference signal in a CCE bandwidth occupied by the PDCCH in the UE specific search space.

The UE 700 provided in the embodiments of the present disclosure includes, but is not limited to, the units described above. For example, the UE 700 may further include a transmitting unit and a storage unit.

Embodiments of the present disclosure also provide a computer readable storage medium. The computer readable storage medium stores a computer program. When the processor of the UE 700 executes the computer program, the UE 700 executes the steps of the related method shown in any of FIG. 4 and FIG. 5.

Embodiments of the present disclosure also provide a computer program product, which causes the computer to execute the steps of the related method in any of FIG. 4 and FIG. 5 when the computer program product runs on the computer.

The UE 700, the computer readable storage medium, or the computer program product provided in the embodiments of the present disclosure is for executing the corresponding methods provided above. Therefore, for the beneficial effects that can be achieved, reference can be made to the beneficial effects in the corresponding methods provided above, which are not repeated here.

Through the description of the above embodiments, those skilled in the art can clearly understand that, for the convenience and brevity of description, only the division of the above functional modules is used as an example. In practical applications, the above functions may be allocated to different functional modules according to needs. That is, the internal structure of the device is divided into different functional modules to complete all or part of the functions described above.

It should be understood that in the embodiments according to the present disclosure, the disclosed device and method may be implemented in other ways. For example, the described embodiments directed to the device are merely exemplary. For example, the modules or units are divided merely in logical function, which may be divided in another way in actual implementation, e.g., multiple units or components may be combined or integrated into another device, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The units described as separate components may or may not be physically separated, and the components shown as units may or may not be physical units, that is, they may be located in one place or distributed over multiple network units. Some or all of the units may be selected according to practical needs to achieve the object of the technical solutions of the embodiments of the present disclosure.

In addition, functional units in various embodiments of the present disclosure may be integrated into one processing unit, or may be physically independent, or two or more units may be integrated into one unit. The integrated unit may be implemented in the form of hardware or in the form of software functional unit.

If the integrated unit is implemented in the form of a software functional unit, and sold or used as a standalone product, the unit may be stored in a readable storage medium. Based on this understanding, essence of the technical solution of the present disclosure, or the part contributing to the related technologies, or all or part of the technical solution, can be embodied in the form of a software product. The software product is stored in a storage medium, and the software product includes a number of instructions to enable a device (which may be a single chip microcomputer, a chip, etc.) or a processor to perform all or part of the steps of the method described in the various embodiments of the present disclosure. The storage medium includes a USB flash disk, a mobile hard disk, a read-only memory (ROM), a random access memory (RAM), a magnetic disk, an optical disk, and other medium which can store program code.

Optional embodiments are described hereinabove. The protection scope of the present disclosure is not limited thereto. Any modification or substitution made without departing from the technical scope of the present disclosure shall fall within the protection scope of the present disclosure. Therefore, the protection scope of the present disclosure is determined by the protection scope of the claims.

What is claimed is:

1. A network device, comprising: a processor, a memory, and a program stored on the memory and executable by the processor, wherein, when the program is executed by the processor, the following steps are implemented:
    transmitting physical downlink control channel (PDCCH) configuration information to a user equipment (UE), wherein the PDCCH configuration information is for indicating at least one search space of a PDCCH of the UE, and the search space comprises a group common search space, wherein the search space of the PDCCH is a space in which the UE performs detection of the PDCCH;
    wherein a starting position of the group common search space of the UE is irrelevant to an identity of the UE.

2. The network device according to claim 1, wherein the group common search space is used by a group including M UEs, one or more group common search spaces correspond to one control resource set, and M is a positive integer greater than or equal to 2.

3. The network device according to claim 1, wherein the search space further comprises at least one of the following types of search spaces: a common search space, or a UE specific search space;
    wherein types of downlink control information (DCI) transmitted by the network device with the different types of search spaces are different.

4. The network device according to claim 3, wherein the DCI transmitted by the network device with the common search space comprises at least one of: DCI for scheduling system information, DCI for scheduling paging information, or DCI for scheduling a random access response message; or,
    wherein the DCI transmitted by the network device with the UE specific search space comprises at least one of: DCI for UE-specific scheduling, or DCI for semi-persistent scheduling.

5. The network device according to claim 1, wherein downlink control information (DCI) transmitted by the network device with the group common search space comprises at least one of: DCI for transmitting a group based power control command, DCI for transmitting group based slot format information, or DCI for transmitting group based resource preemption indication.

6. The network device according to claim 5, wherein the PDCCH transmitted with the group common search space has a QCL relationship with a synchronization signal or a group of synchronization signals, and the synchronization signal or the group of synchronization signals are configured by the network device; or,
    wherein the PDCCH transmitted with the group common search space has a QCL relationship with a channel state information-reference signal (CSI-RS) or a group of CSI-RSs, and the CSI-RS or the group of CSI-RSs are configured by the network device.

7. The network device according to claim 4, wherein the PDCCH transmitted with the common search space has a quasi-co-location (QCL) relationship with a synchronization signal or a group of synchronization signals, and there is a correspondence between the synchronization signal or the group of synchronization signals and a physical broadcast channel (PBCH) configuring a physical resource of the common search space.

8. The network device according to claim 6, wherein:
    the PDCCH configuration information comprises group common search space position information of the UE, and a position of the group common search space of the UE is irrelevant to the identity of the UE, and wherein the group common search space position information of the UE comprises at least one of: the starting position of the group common search space of the UE, a control channel element (CCE) aggregation level of the group common search space of the UE, or the quantity of PDCCH candidate resources of the group common search space of the UE; or,
    group common search space position information of the UE is pre-configured by a protocol, and a position of the group common search space of the UE is irrelevant to the identity of the UE, and wherein the group common search space position information of the UE comprises at least one of: the starting position of the group common search space of the UE, a CCE aggregation level of the group common search space of the UE, or the quantity of PDCCH candidate resources of the group common search space of the UE.

9. A non-transitory computer readable storage medium, having a program stored thereon, wherein, when the program is executed by a processor, the following steps are implemented:
receiving physical downlink control channel (PDCCH) configuration information transmitted by a network device, wherein the PDCCH configuration information is for indicating at least one search space of a PDCCH of a user equipment (UE), the search space comprises a group common search space, wherein the search space of the PDCCH is a space in which the UE performs detection of the PDCCH; and
monitoring the search space of the PDCCH of the UE indicated by the PDCCH configuration information, and receiving DCI corresponding to the search space of the PDCCH of the UE;
wherein a starting position of the group common search space of the UE is irrelevant to an identity of the UE.

10. The non-transitory computer readable storage medium according to claim 9, wherein the group common search space is used by a group including M UEs, one or more group common search spaces correspond to one control resource set, and M is a positive integer greater than or equal to 2.

11. The non-transitory computer readable storage medium according to claim 9, wherein the search space further comprises at least one of the following types of search spaces: a common search space, or a UE specific search space;
wherein types of downlink control information (DCI) transmitted by the network device with the different types of search spaces are different.

12. The non-transitory computer readable storage medium according to claim 11, wherein the receiving the DCI corresponding to the search space of the PDCCH of the UE comprises: receiving DCI corresponding to the common search space, and the receiving the DCI corresponding to the common search space comprises at least one of: receiving DCI for scheduling system information, receiving DCI for scheduling paging information, or, receiving DCI for scheduling a random access response message; or,
wherein the receiving the DCI corresponding to the search space of the PDCCH of the UE comprises: receiving DCI corresponding to the UE specific search space, and the receiving the DCI corresponding to the UE specific search space comprises at least one of: receiving DCI for UE-specific scheduling, or, receiving DCI for semi-persistent scheduling.

13. The non-transitory computer readable storage medium according to claim 9, wherein the receiving the DCI corresponding to the search space of the PDCCH of the UE comprises: receiving DCI corresponding to the group common search space, and the receiving the DCI corresponding to the group common search space comprises at least one of: receiving DCI for transmitting a group based power control command, receiving DCI for transmitting group based slot format information, or, receiving DCI for transmitting group based resource preemption indication.

14. The non-transitory computer readable storage medium according to claim 13, wherein the PDCCH transmitted with the group common search space has a QCL relationship with a synchronization signal or a group of synchronization signals, and the synchronization signal or the group of synchronization signals are configured by the network device; or,
wherein the PDCCH transmitted with the group common search space has a QCL relationship with a channel state information-reference signal (CSI-RS) or a group of CSI-RSs, and the CSI-RS or the group of CSI-RSs are configured by the network device.

15. The non-transitory computer readable storage medium according to claim 12, wherein the PDCCH transmitted with the common search space has a quasi-co-location (QCL) relationship with a synchronization signal or a group of synchronization signals, and there is a correspondence between the synchronization signal or the group of synchronization signals and a physical broadcast channel (PBCH) configuring a physical resource of the common search space.

16. The non-transitory computer readable storage medium according to claim 14, wherein:
the PDCCH configuration information comprises group common search space position information of the UE, and a position of the group common search space of the UE is irrelevant to the identity of the UE, and wherein the group common search space position information of the UE comprises at least one of: the starting position of the group common search space of the UE, a control channel element (CCE) aggregation level of the group common search space of the UE, or the quantity of PDCCH candidate resources of the group common search space of the UE; or,
group common search space position information of the UE is pre-configured by a protocol, and a position of the group common search space of the UE is irrelevant to the identity of the UE, and wherein the group common search space position information of the UE comprises at least one of: the starting position of the group common search space of the UE, a CCE aggregation level of the group common search space of the UE, or the quantity of PDCCH candidate resources of the group common search space of the UE.

17. A non-transitory computer readable storage medium, having a program stored thereon, wherein, when the program is executed by a processor, the following steps are implemented:
transmitting physical downlink control channel (PDCCH) configuration information to a user equipment (UE), wherein the PDCCH configuration information is for indicating at least one search space of a PDCCH of the UE, and the search space comprises a group common search space, wherein the search space of the PDCCH is a space in which the UE performs detection of the PDCCH;
wherein a starting position of the group common search space of the UE is irrelevant to an identity of the UE.

18. The non-transitory computer readable storage medium according to claim 17, wherein downlink control information (DCI) transmitted by the network device with the group common search space comprises at least one of: DCI for transmitting a group based power control command, DCI for transmitting group based slot format information, or DCI for transmitting group based resource preemption indication.

19. The non-transitory computer readable storage medium according to claim 18, wherein the PDCCH transmitted with the group common search space has a QCL relationship with a synchronization signal or a group of synchronization signals, and the synchronization signal or the group of synchronization signals are configured by the network device; or, wherein the PDCCH transmitted with the group common search space has a QCL relationship with a channel state information-reference signal (CSI-RS) or a group of CSI-RSs, and the CSI-RS or the group of CSI-RSs are configured by the network device.

20. The non-transitory computer readable storage medium according to claim 19, wherein:

the PDCCH configuration information comprises group common search space position information of the UE, and a position of the group common search space of the UE is irrelevant to the identity of the UE, and wherein the group common search space position information of the UE comprises at least one of: the starting position of the group common search space of the UE, a control channel element (CCE) aggregation level of the group common search space of the UE, or the quantity of PDCCH candidate resources of the group common search space of the UE; or, group common search space position information of the UE is pre-configured by a protocol, and a position of the group common search space of the UE is irrelevant to the identity of the UE, and wherein the group common search space position information of the UE comprises at least one of: the starting position of the group common search space of the UE, a CCE aggregation level of the group common search space of the UE, or the quantity of PDCCH candidate resources of the group common search space of the UE.

* * * * *